United States Patent
Doehla et al.

(10) Patent No.: US 6,405,755 B1
(45) Date of Patent: Jun. 18, 2002

(54) DIRECTLY CONTROLLED MAGNETIC VALVE

(75) Inventors: Werner Doehla, Gefrees; Werner Schieweck, Thierstein, both of (DE)

(73) Assignee: Rapa Rausch & Pausch Elektrotechnische Spezialfabrik GmbH, Selb (DE)

(*) Notice: Subject to any disclaimer, the term of this patent is extended or adjusted under 35 U.S.C. 154(b) by 0 days.

(21) Appl. No.: 09/857,223
(22) PCT Filed: Dec. 1, 1999
(86) PCT No.: PCT/EP99/09331
§ 371 (c)(1), (2), (4) Date: Jun. 1, 2001
(87) PCT Pub. No.: WO00/32971
PCT Pub. Date: Jun. 8, 2000

(30) Foreign Application Priority Data

Dec. 1, 1998 (DE) .......................................... 198 56 476

(51) Int. Cl.[7] .............................................. F16K 31/06
(52) U.S. Cl. .............. 137/613; 251/129.15; 137/596.17
(58) Field of Search .......................... 137/613, 596.17, 137/625.64; 251/129.15, 129.21

(56) References Cited

U.S. PATENT DOCUMENTS

| 3,502,105 A | * | 3/1970 | Ernyei et al. | ....... 251/129.21 X |
| 4,582,294 A | * | 4/1986 | Fargo | ................ 251/129.21 X |
| 4,595,170 A | | 6/1986 | Livet | |
| 5,423,347 A | | 6/1995 | Weber | |
| 5,775,670 A | * | 7/1998 | Osterbrink | ............. 251/129.15 |
| 5,791,630 A | | 8/1998 | Nakao et al. | |

FOREIGN PATENT DOCUMENTS

DE          3345928 A1    6/1985

* cited by examiner

Primary Examiner—Kevin Lee
(74) Attorney, Agent, or Firm—Jordan and Hamburg LLP

(57) ABSTRACT

The invention relates to a directly controlled magnetic valve, comprising a fixed core which is located in a magnet and a moving armature to which a seal plate is fixed by means of a tappet. When the valve is activated, the seal plate interacts with a valve seat which is fixed to the housing. Corresponding sealing elements are provided on the seal plate and on the valve seat and at least the tappet and the seal plate have bores which are situated centrally in the longitudinal direction. The aim of the invention is to produce a magnetic valve which has a large nominal width allowing a small construction volume, a low power requirement, rapid pressure compensation and rapid switching. To this end, second sealing elements which correspond with each other are provided on a front face which is permanently connected to the armature and on an adjacent face which is fixed to the housing. Like the first sealing elements, these second sealing elements are situated at least approximately coaxially to the geometrical longitudinal axis. The second sealing elements delimit at least approximately the same pressure surface as the first sealing elements. The first and second sealing elements are effective at the same time.

17 Claims, 4 Drawing Sheets

DIRECTLY CONTROLLED MAGNETIC VALVE

BACKGROUND OF THE INVENTION

The invention relates to a directly controlled magnetic valve which exhibits a great nominal diameter of the valve seat opening for connecting and shutting-off, respectively, two gas volumes, in particular, air volumes.

There are already known closed pre-controlled magnetic valve systems in which a pressure difference between the inlet of the valve and the outlet of the valve is utilized to operate a sealing means via a membrane or a piston. When the magnetic coil is de-energized, the input pressure is directed via a compensation bore into the space on top of the membrane to urge the same onto the valve seat. When the magnet opens the pre-controlled port, then the pressure on the membrane breaks down and the membrane will be raised by the input pressure applied, whereby the valve is opened in this way. This, however, requires a pressure difference between the two outlets of each valve system to allow valve actuation. From hydraulics technology there is further known to design the magnet armature in magnetic valves as pressure compensating slide valves. Moveable sealing systems are used for shutting-off the compensating slit, however, the shutting-off being in most cases not a complete one. Aside from the fact that, under cold conditions, there is the possibility of icing and sticking of the slide valve when very long slits have to be sealed, comparatively high breakaway forces and motion forces have to be applied to move the slide valve.

Furthermore, there has already been proposed to pre-control a differential piston by a magnetic valve. Thereby, the motive force is produced by a pressure applied to a control chamber or by the deairing of the control chamber. The moving sealings used are disadvantageous, since these require high breakaway forces, apart from not being sufficiently tight over their service life. When the pressure in the control chamber is relieved, the respective air is vented into the ambience which might lead to operational failures in the valve system. There has also been proposed a valve including a precontrolled membrane. In this case the motion is obtained by the pressure differences between two valve outlets in cooperation with a spring. In order to realize this proposal, the switching air with all its disadvantageous side-effects is required. Finally, in the also proposed use of seat valves very high spring forces and magnetic forces, respectively, are required, due to the high pressure forces applied for opening and closing the valves, the spring forces and magnetic forces very often cannot be realized in the interior space at disposal.

SUMMARY OF THE INVENTION

It is an object of the present invention to obviate the above mentioned disadvantages and to provide a magnetic valve of a great nominal diameter that requires a small constructional volume at a simultaneous low power requirement, and which further exhibits a minimum of leakage to the outside and between the two gas volumes when the valve is in the closed state, and which still further enables a fast compensation of pressure after the valve has been opened as well as a fast switching of the valve, irrespective of on which side of the valve the higher pressure is applied.

According to the invention the object is realized by the features of the first patent claim. A pressure compensation takes place due to a bore passing through the entire magnetic core and, hence, through the valve actuator and the valve tappet. Thus the same force is effective to the two leading faces of the valve actuator. Advantageously, the first and the second sealing means are of a same arrangement with respect to the geometrical longitudinal axis of the core. The sealing means, which correspond with each other, and which are arranged at the sealing disk and at the sealing seat as well as at the leading face of the valve actuator and at the face secured to the valve housing, whereby the face is adjacent to the leading face, have the same orientation to and a same distance from the geometrical longitudinal axis. In this way it is possible to compensate for tolerances in the valve actuator and in the valve tappet, respectively in the magnetic core and housing at a simultaneous operation of the two sealing means. When the tappet, which is of hollow cylindrical design and which is secured to the sealing disk, is pressed into the bore at the actuator, the pressing tool, while pressing, can be set- in step by step and simultaneously the flow rate can be measured until the ideal adjustment is obtained. It is, however, also possible to measure at first the actual value of the components and to compute the required pressure measure on the basis of these measured actual values. Thereby the pressure is so dimensioned that there will be no leakage over the entire length of pressure.

The sealing means, which correspond with each other, are provided either in the magnet of the valve, namely in the leading faces of the actuator and the magnet core, whereby these leading faces are adjacent to each other in facing opposition, or outside of the magnet at the other leading face of the actuator and at an adjacent preferably flanged face secured to the housing, wherein the face is of annular shape. The sealing means, which correspond with each other and which are arranged on faces facing each other, are, on the one hand, a sealing ring made of an elastomer which is disposed on or in the respective leading face and, on the other hand, an annular bulge or the like provided on the associated leading face. It is also possible that the elastomeric sealing rings are provided with bulges (to have them project out of their leading face), which then are urged onto the respective leading face, in this case the latter being designed flat. Anyhow, the sealing rings can be embedded fixedly and tightly in the corresponding leading faces, for example, by vulcanizing them into the latter. Advantageously, the embedding itself is, to balance for tolerances, resiliently designed by installation of additional spring means.

Advantageously, the sealing disk is provided with a tappet which projects into the bore of the valve actuator and preferably is pressfitted to the latter. The leading faces of the valve actuator and of the fixed core, whereby the faces are facing each other, can be designed plane or they can be provided with annular steps.

The directly controlled magnetic valve according to the present invention, which is used for switching over between two gas volumes, can be combined with a second magnetic valve for filling with or shutting-off a gaseous medium (air), the second magnetic valve being preferably also a directly controlled one. The shutting-off valve and the switching-over valve can be directly arranged at one block. Advantageously, the two valves are voltage-supplied via a common connector plug. In this case the filling and the discharge of the air volumes is carried out via the central compensation bores, which are substantially arranged about the geometrical axis of the core and of the valve actuator of the switching-over valve, whereby the compensation bores pass through all faces that are enclosed by the first and the second sealing means. In this way a complex boring will be avoided and space and material will be saved.

It is also possible to manufacture the armature (valve actuator), the tappet, and the sealing disk of the magnetic valve of the present invention in one piece. Alternatively, an additional advantageous embodiment will result, when the core is arranged between the armature and the sealing disk and the first and the second sealing means are provided on the respective leading faces on the side of the sealing disk. In this case the initially central bore can also laterally leave the tappet, provided that the remaining parts of the magnetic valve are correspondingly designed and arranged.

According to the present invention the valve can be so designed that, when the electromagnet is de-energized, it can be opened (currentless open) or closed (currentless closed). Particularly advantageous according to the present invention is the solution with the currentless open magnetic valves, since there is, due to the pressure compensation, only a low spring force necessary to release the armature and, consequently, for lifting the sealing disk from its seat. Likewise, only a comparatively low energy is required for shutting-off and keeping the magnetic valve shut, due to the low spring force.

BRIEF DESCRIPTION OF THE DRAWINGS

The invention will be explained hereinafter in more detail by virtue of schematical embodiments illustrating two axial sections.

There is shown in.

DETAILED DESCRIPTION OF THE INVENTION

Figure 1:
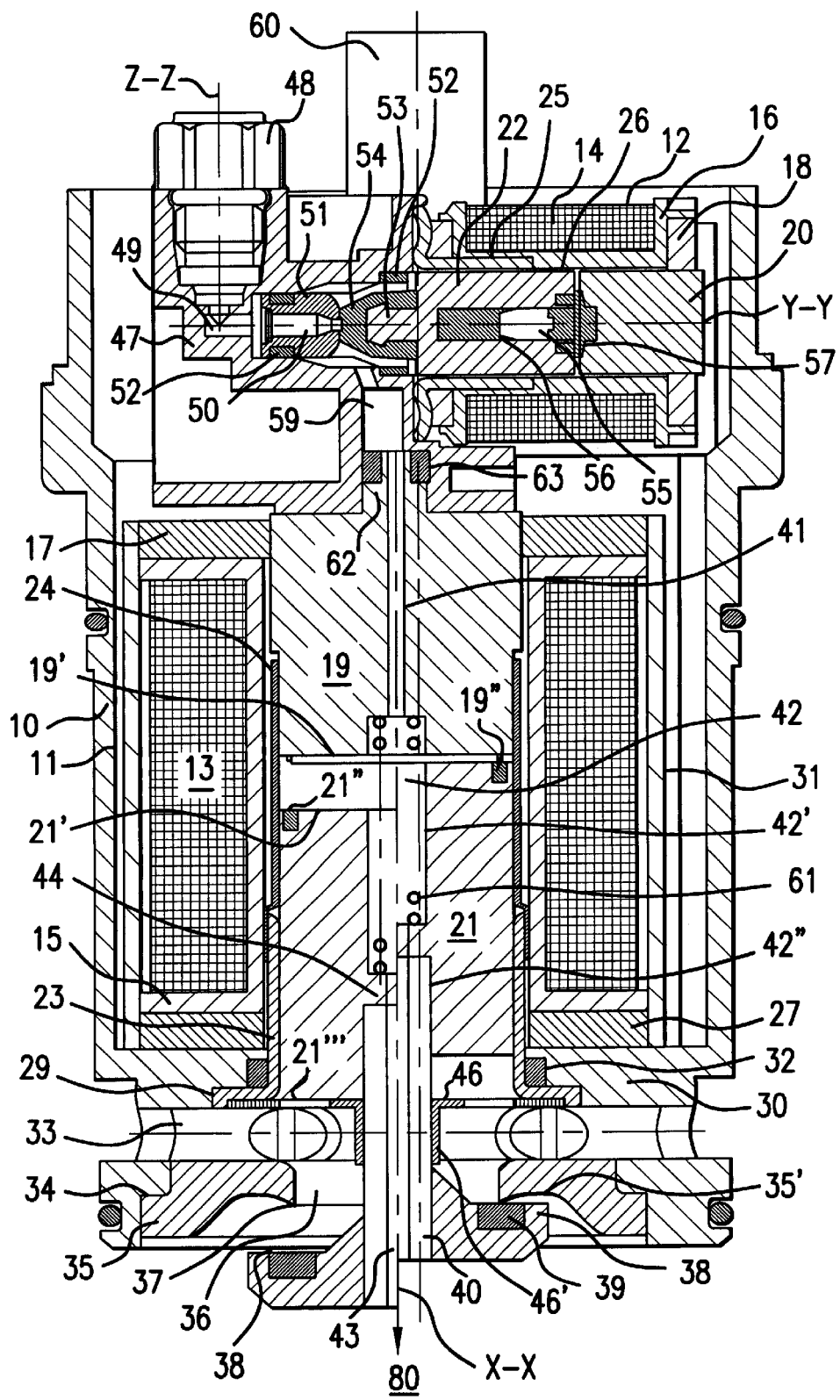
FIG. 1 a currentless open magnetic valve according to the present invention.

Referring to FIG. 1, there are shown two directly controlled magnetic valves 11, 12 in a housing 10, the magnetic valves having geometrical axes X—X and Y—Y, respectively. Each of the magnetic valves is provided with a magnetic coil 13 and 14, respectively, with a coil holder 15 and 16, respectively. The coil holder 15 and 16, respectively, is of hollow cylindrical design and is attached at one of its ends to a disk 17, respectively to a bracket 18, the latter being partially arranged behind the drawing plane. Each of the magnetic valves further comprises a core 19 and 20, respectively, which are arranged adjacent to the disk 17, respectively to the corresponding end of the bracket, whereby the core 19 and the core 20, respectively, projects from one side into the respectively associated hollow coil holder 15 and 16, respectively. Furthermore, each magnetic valve 11 and 12, respectively, is provided with a valve actuator or armature 21 and 22, respectively, which can slide in slide-shells 23, 24 and 25, 26, respectively. These shells are slidingly fitted onto the core 19 and 20, respectively, and tightly welded to them.

The slide-shell 23 of the magnetic valve 11 is provided with a flange portion 29 by aid of which it abuts against an inwardly cantilevered annular portion 30 of the housing 10. Additionally, the magnetic valve 11 is enclosed by a cylindrical envelope 31, via which the magnetic valve 11 rests upon the housing portion 30, just as it does with the disk 27. In this manner a magnetic circuit is obtained for the magnetic valve 11, comprising the components 27, 23, 21, 19, 17, 31, 27. A sealing ring 32 is provided between the slide-shell 23 and the housing portion 30.

In FIG. 1, there are provided air channels 33 and a valve seat 35 below the circular housing portion 30. The valve seat 35 is screwed into the valve housing 10 and sealingly rests upon an annular shoulder 34 of the housing 10, the valve seat 35 including a leading face 35' off-sided relative to the armature 21 and a central opening 36, the diameter of which is smaller than the inner diameter of the hollow cylindrical coil holder 15. The valve seat 35 has an annular projecting edge 37 (a bulging up) in the vicinity of its central opening 36, the projecting edge is directed off from the air channels 33 and cooperates with a sealing ring 39 inserted into a sealing disk 38. When the valve 11 is in the shut-off state, the projecting edge 37 is urged against the sealing ring 39. A hollow cylindrical tappet 40 is connected to the sealing disk 38, the leading face of which, facing the armature 21, is designed by 38'. The tappet 40 is directed towards the armature 21. The core 19, the armature 21, and the tappet 40 are provided with axial bores 41, and 42, and 43, respectively, the bores partly having different diameters and are commonly forming the compensation bore of the valve 11. Nevertheless, the diameters of the bores 41, 42, and 43 are substantially equal. In the interior of the bore 42 there is an annular shoulder 44 provided which divides the bore 42 into an upper spring housing 42' for a compression spring 61 and into a lower forcing-in portion 42" for the tappet 40, and which serves as a stop for the compression spring 61. The tappet 40 and the sealing disk 38 can be jointly designed as one piece. A mounting disk 46, perforated in its plane, serves as a stop for the other leading face 21''' of the armature 21 and is secured to the flange portion 29, the mounting disk 46 is provided with a guiding neck 46' for guiding the tappet 40. At their leading faces (pole faces) 19' and 21', respectively, which are facing each other, the core 19 is provided with an annular projecting edge (a bulging up) 19" and the armature 21 with a matching sealing ring 21" inserted into the face 21'. When the valve 11 is in the closed state, the projecting edge 19" is urged into the sealing ring 21". The annular edges 19" and 37 as well as the sealing rings 21" and 39 cooperating with the former, have a same distance to the geometrical axis X—X and are coaxially arranged to the axis. On the leading faces 19', 21', 21''' and 38', at least approximately the same pressure areas, which are affected by the gas pressure, are delimited by the sealing elements 19", 21", 37, 39. As to the invention, the simultaneous effect of the sealing elements 19", 21" and 37, 39, respectively, is of decisive relevance.

In the housing 10, a second magnetic valve 12 is arranged in a block 47 above the magnetic valve 11 and fixedly connected to the first magnetic valve. A compression gas connection 48 is worked into the block 47 in such a way that its geometrical axis Z—Z is at right angles to the valve axis Y—Y. A connecting duct 49 extends through a central opening 50 of a valve seat 51 to the valve 12. The valve seat 51 is gastightly arranged by means of an elastomer ring 52 within the block 47. The central opening 50 can be closed by a tappet 53, which is connected to the armature 22, preferably by working the tappet on to the armature, the tappet being provided with an elastomer cover 54 in the vicinity of the valve seat 51. An axial bore 55 for a resilient pressure means 56 is disposed in the armature 22 and the core 20, the resilient pressure means tends to urge the tappet 53 against the valve seat 51. The elastomer cover 54 prevents together with the elastomer ring 52 any leakage at the valve 12. A bulged ring 57 at the leading face of the armature 22 facing the core 20 serves for damping the stopping impact. By means of the shell 25 the valve 12 is flanged to the block 47, and secured to the same. A connection duct 59 leads from the valve 12 to the axial compensation bore in the valve 11. In order to provide for a connection port for the connection duct 59, the core 19 carries a socket 62, about which a O-ring 63 is mounted. Both valves 11, 12 have a common electric connection 60. They are so designed that, in the currentless state, the magnetic valve 11 is open and the magnetic valve 12 is closed.

The right half of FIG. 1 shows the valve 11 in the closed state and the left half in the open state. When both valves 11 and 12 are in the open state, then the same pressure as applied at the compression gas connection 48 is built-up in the volume 80 and 82, respectively, which are connected to the compensation bore and the channels 33, respectively, via the compensation bores 41, 42, 43. When then the magnetic valve 12 is closed, the built-up pressure is maintained, that means, that the magnetic valve 12 is substantial as concerns the pressure level. When the magnetic valve 11 is closed (right half in FIG. 1) then a pressure can be built-up in the volume 80 different to that in volume 82.

Figure 2:
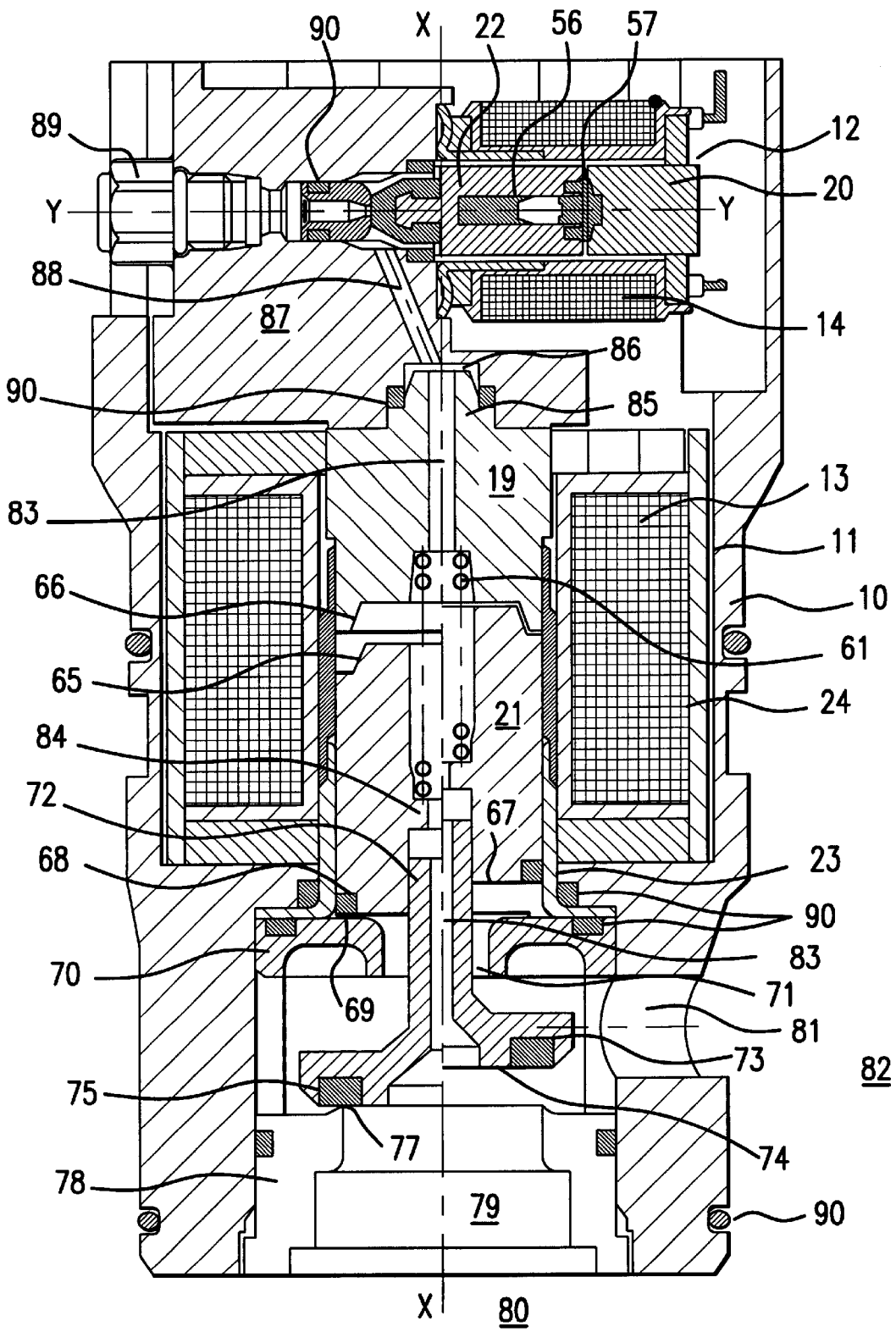
FIG. 2 a second currentless closed magnetic valve according to the present invention, FIG. 3 an armature, a sealing disk and a tappet as one piece, and FIG. 4 a core arranged between an armature and a sealing disk.

Referring to FIG. 2, there are again shown two magnetic valves 11, 12 in the housing 10 (similar to that described in FIG. 1), the magnetic valves having magnetic coils 13 and 14, magnetic cores 19, 20 and magnetic armatures 21, 22, which in the currentless state are pushed off from the core 19, 20 by resiliently loaded means 61, 56 (for example, by mechanical springs). The geometrical axes of the magnetic valves 11, 12 are designated by X—X and Y—Y and are substantially at right angles to each other. The armature 21 and the core 19 are provided with stepped pole faces (leading faces) 65, 66, which are facing each other and which permit a sliding engagement of the armature 21 and the core 19 with one another and thus allow for increased magnetic forces at the start of the armature motion. The armature 21 slides in slide-shells 23, 24 and, in contrast to FIG. 1, its leading face 67, which is in remote opposition to the pole face 65, is provided with a sealing ring 68 inserted into the leading face. The sealing ring 68 matches with an annular bulge 69 upon the face of a stop-disk 70, whereby the face is adjacent to and turned towards the armature 21. The stop-disk 70 is provided with an axial passage 71, through which a tappet 72 of a sealing disk 73 projects, whereby the sealing disk 73 is provided with a sealing ring 75 on its face 74 which is remote and turned away from the armature 21. The free end of the tappet 72 is tightly press-fitted to the armature 21. The sealing ring 75 cooperates with an annular bulged-up edge 77 of a valve seat 78 which, in FIG. 2, is screwed into the housing 10 from the bottom side. The sealing rings 68 and 75 as well as the annular bulge 69 and the annular bulged-up edge 77 are substantially coaxially arranged to and have a same distance to the geometrical axis X—X. The valve seat 78 is provided with a recess 79 coaxially to the axis X—X, via which the interior of the valve 11 can be connected to a, as for the rest, not shown gas volume 80. The housing 10 is also provided with at least one opening 81 at the level of the sealing disk 73, whereby the opening is aligned substantially horizontal and diagonal to the valve axis X—X. This opening allows to connect the interior space of the valve to a, as for the rest, not shown gas volume 82 other than the gas volume 80. The tappet 72, the armature 21, and the core 19 are provided with a compensation bore 83 which is coaxially directed to the axis X—X. This compensation bore is widened in the armature 21 and in the lower portion of the core 19 and supports, in the armature 21, an annular shoulder 84 against which the spring 61 abuts. The tappet 72 is adjustably pressed into the widened portion of the compensation bore 83 in the armature 21 below the annular shoulder 84. In FIG. 2, on the left side, the armature 21, the tappet 72 and the sealing disk 73 are shown in the closed position and, on the right side in the open position of the valve 11. In the closed position, the two gas volumes 80, 82 are separated from each other, and in the open position they are connected with each other.

The core 19 is axially provided with a socket 85 on that of its sides which is turned away from the armature 21. The socket 85 projects into a recess 86 of a block 87 that is attached to the valve 11, the block being arranged within the housing 10. The socket projects 85 into the recess 86 in such a way that the compensation bore 83 is connected, via a bore 88, provided in the block 87, to a compression gas connection 89, which with the valve 12 is coaxially arranged to the axis Y—Y. The valve 12 which is setup in analogy to FIG. 1 closes the compression-gas connection 89. Elastomer sealings 90 provide for the tightness of the valves 11, 12.

As to the rest, the same is true as specified with respect to FIG. 1, at least in a corresponding sense.

Figure 3:
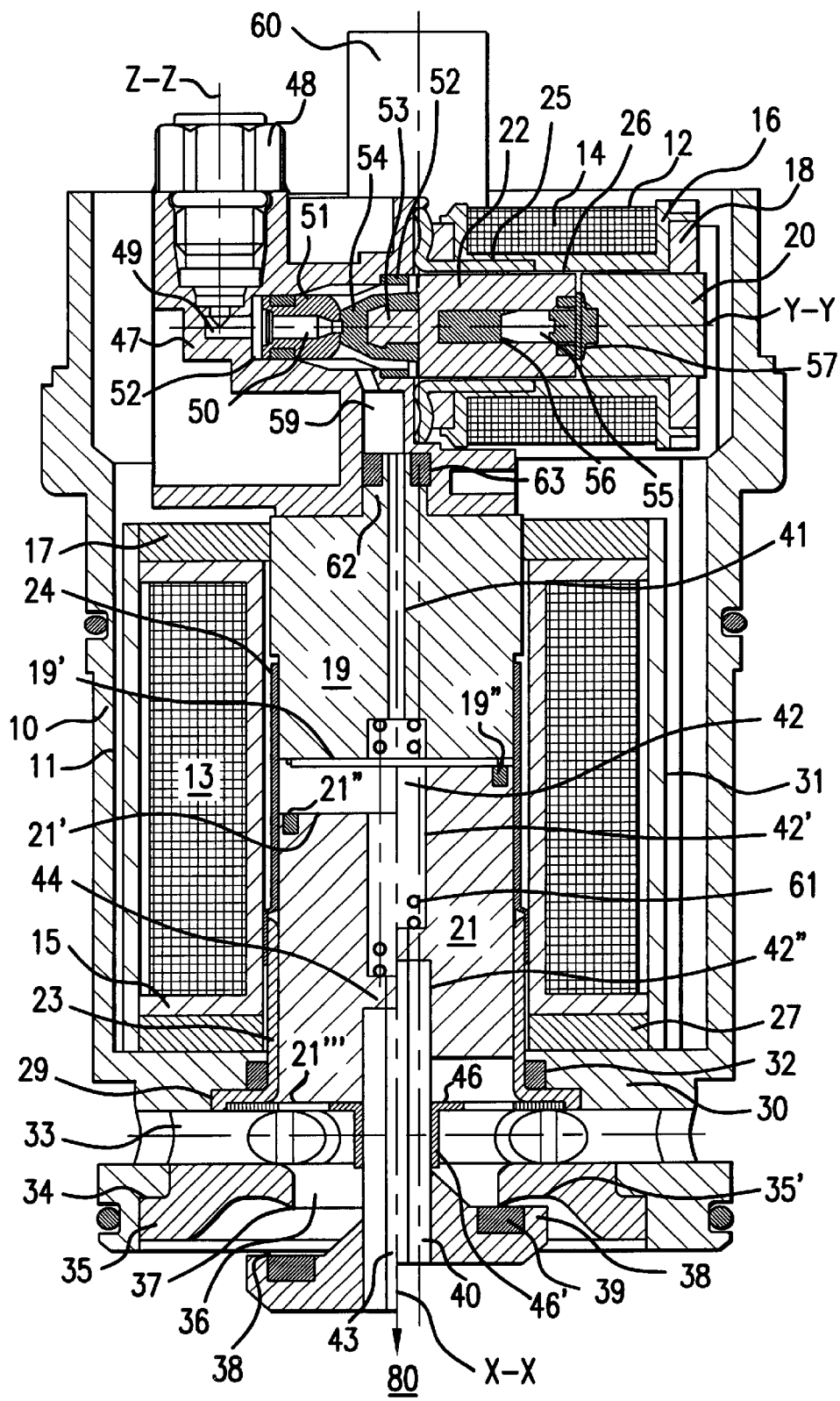
Figure 4:
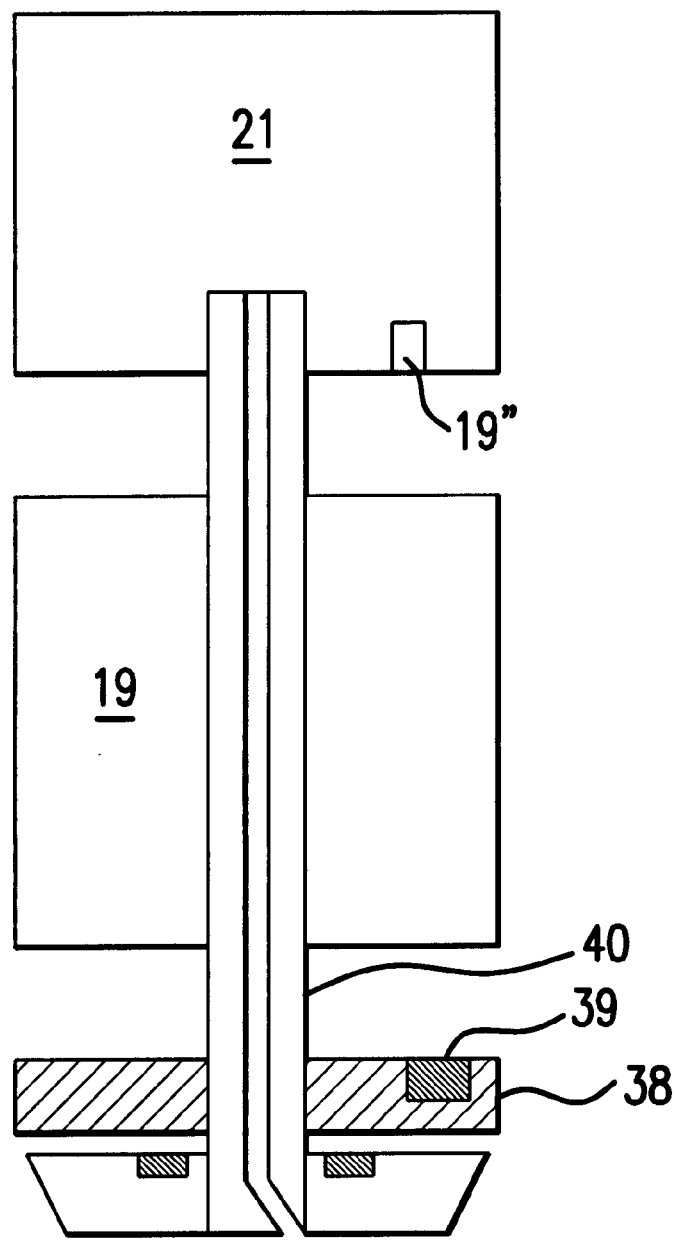

Departing from the aforementioned embodiments, it lies within the scope of the invention to design the armature 21, the tappet 40, and the sealing disk 38 as one piece, as shown in FIG. 3, similar to the design of valve 12, furthermore, to arrange the core 19 between the armature 21 and the sealing disk 38, as shown in FIG. 4, to provide the respective leading faces of the sealing means 19", 21", 37, 39 on the side of the sealing disk 38, to pass out the compensation bores 41, 42, 43 laterally from the tappet 40 and into a correspondingly arranged compression-gas connection 48 rather than to have the compensation bores 41, 42, 43 passing through the armature 21, the core 19, the tappet 40, and the sealing disk 38.

All features disclosed in the specification, in the subsequent claims, and in the drawing can be substantial for the invention both, individually and in any combination with one another.

What is claimed is:

1. A directly controlled magnetic valve comprising a core fixedly arranged within a magnet, a moveable armature, a sealing disk, said sealing disk being secured to said armature by means of a tappet, and a valve seat fixedly arranged to the valve housing, said sealing disk cooperating with said valve seat when the valve is being actuated, whereby said sealing disk and said valve seat are each provided with first sealing means, said first sealing means being adapted to correspond with each other, and second sealing means are provided at least at the armature, said second sealing means and said first sealing means are arranged at least approximately coaxially relative to a longitudinally extending axis X—X and in parallel to the tappet of the valve and whereby at least the armature, the tappet, and the sealing disk are provided with central bores extending in parallel to the longitudinal axis X—X, wherein the second sealing means are provided at a leading face, which is fixedly connected to said armature and arranged substantially at right angles to the longitudinal axis X—X, and at a face, secured to the housing, in parallel to and adjacently arranged relative to said leading face, in such a manner that said second sealing means at least approximately limit the same pressure area as said first sealing means and in that the first and the second sealing means are simultaneously effective.

2. A directly controlled magnetic valve as claimed in claim 1, wherein said second sealing means are arranged at the leading face of the armature located within the magnet and at the leading face of the core adjacent to the armature.

3. A directly controlled magnetic valve as claimed in claim 1, wherein said second sealing means are arranged at the leading face of the armature located outside of the magnet and at an annular cantilevered face secured to the housing adjacent to the armature.

4. A directly controlled magnetic valve as claimed in claims 1, 2 or 3 wherein the sealing means corresponding with each other on adjacent faces are, on the one hand, sealing rings made of an elastomer and, on the other hand annular bulgings-up of the faces.

5. A directly controlled magnetic valve as claimed in claim 1, wherein the sealing means are elastomer rings partially inserted into the leading faces which are opposed by adjacent plane leading faces.

6. A directly controlled magnetic valve as claimed in claim 1, wherein said sealing disk is provided with said tappet which projects into and is tightly press-fitted to the bore of the armature.

7. A directly controlled magnetic valve as claimed in claim 6, wherein a depth the tappet is pressed into the central bore of the armature is variable.

8. A directly controlled magnetic valve as claimed in claims 1, wherein the leading faces of the armature and of the core, being adjacent to each other, are plane faces.

9. A directly controlled magnetic valve as claimed in claim 1, wherein the adjacent leading faces of the armature and of the core are provided with annular steps matching each other.

10. A directly controlled magnetic valve as claimed in claims 1, 2, 3, 5, 6, 7, 8 or 9, wherein a bore is provided centrally passing the core, the armature, and the tappet with the sealing disk in parallel to a geometrical longitudinally extending axis, said bore being adapted for compensating pressure differences.

11. A directly controlled magnetic valve as claimed in claim 10, wherein a second magnetic valve is associated to said directly controlled magnetic valve, said second magnetic valve being adapted for closing the central bore.

12. A directly controlled magnetic valve as claimed in claim 11, wherein both magnetic valves are provided with a common electrical connection.

13. A directly controlled magnetic valve as claimed in claim 5, wherein the sealing rings in the armature and in the sealing disk are fixedly and tightly embedded in the same.

14. A directly controlled magnetic valve as claimed in claim 13, wherein the sealing rings are resiliently embedded for compensating for tolerances.

15. A directly controlled magnetic valve as claimed in claim 1, wherein the armature, the tappet, and the sealing disk consist in one piece.

16. A directly controlled magnetic valve as claimed in claim 1 or 15, wherein the core is arranged between the armature and the sealing disk, the tappet is passed through the core and the first and the second sealing means are arranged on the side of the sealing disk.

17. A directly controlled magnetic valve as claimed in claim 15, wherein the central bore of the tappet is passed out of the tappet diagonally to the longitudinal axis.

\* \* \* \* \*